(12) United States Patent
Riedel

(10) Patent No.: US 11,912,413 B2
(45) Date of Patent: Feb. 27, 2024

(54) PANEL FOR MOUNTING A PASSENGER SUPPLY UNIT AND A PASSENGER SUPPLY UNIT

(71) Applicant: Airbus Operations GmbH, Hamburg (DE)

(72) Inventor: Christian Riedel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1265 days.

(21) Appl. No.: 16/509,005

(22) Filed: Jul. 11, 2019

(65) Prior Publication Data

US 2019/0351265 A1   Nov. 21, 2019

Related U.S. Application Data

(62) Division of application No. 14/988,389, filed on Jan. 5, 2016, now abandoned.

(30) Foreign Application Priority Data

Jan. 5, 2015   (EP) ..................... 15150128

(51) Int. Cl.
*B64D 11/00* (2006.01)
*A62B 25/00* (2006.01)
*B64D 13/00* (2006.01)
*A62B 7/14* (2006.01)

(52) U.S. Cl.
CPC .......... *B64D 11/00* (2013.01); *A62B 25/005* (2013.01); *B64D 11/0015* (2013.01); *B64D 13/00* (2013.01); *A62B 7/14* (2013.01); *B64D 2011/0053* (2013.01); *B64D 2231/02* (2013.01); *Y02T 50/40* (2013.01)

(58) Field of Classification Search
CPC .... A62B 7/14; A62B 25/005; B64D 2231/02; B64D 11/00; B64D 11/0015; B64D 13/00
See application file for complete search history.

(56) References Cited

U.S. PATENT DOCUMENTS

| 3,615,250 A | 10/1971 | Vernon |
| 2006/0118115 A1 | 6/2006 | Cannon |
| 2012/0032027 A1 | 2/2012 | Gehm et al. |

(Continued)

FOREIGN PATENT DOCUMENTS

EP   2 801 523   11/2014

OTHER PUBLICATIONS

European Search Report cited in EP 15150128.5, dated Jun. 24, 2015, 5 pages.
U.S. Appl. No. 14/988,389 Office Action (dated Mar. 20, 2020).

*Primary Examiner* — Joseph D. Boecker
(74) *Attorney, Agent, or Firm* — Nixon & Vanderhye P.C.

(57) ABSTRACT

A panel for covering a supply channel in a passenger cabin of a vehicle including a mounting surface facing the passenger cabin while the panel covers the supply channel. The panel is elongated in a longitudinal direction and adapted for mounting passenger supply units. The mounting surface includes spaced openings arranged along a longitudinal direction of the panel, wherein each opening includes a connector assembly for a passenger supply unit. The panel includes a mount securing passenger supply units. The mounting surface comprises extended areas for providing support in opposing lateral directions to passenger supply units mounted to the panel.

13 Claims, 2 Drawing Sheets

(56) References Cited

U.S. PATENT DOCUMENTS

| | | | |
|---|---|---|---|
| 2012/0228425 A1 | 9/2012 | Schneider et al. | |
| 2012/0312921 A1* | 12/2012 | Grosse-Plankermann | ................. B64D 11/00 244/118.5 |
| 2013/0039020 A1 | 2/2013 | Rittner et al. | |
| 2013/0074836 A1* | 3/2013 | Contino | ................... A62B 7/08 128/205.25 |
| 2014/0329452 A1* | 11/2014 | Wirth | ........................ B64F 5/10 29/525.01 |

* cited by examiner

PANEL FOR MOUNTING A PASSENGER SUPPLY UNIT AND A PASSENGER SUPPLY UNIT

RELATED APPLICATIONS

This application is a divisional of U.S. patent application Ser. No. 14/988,389 filed Jan. 5, 2016 and claims priority to European Patent Application No. 15150128.5 filed Jan. 5, 2015, the entirety of both applications are incorporated by reference.

BACKGROUND OF THE INVENTION

The present invention relates to a panel for covering a supply channel in a passenger cabin of a vehicle. The panel comprises a mounting surface for facing towards the passenger cabin while the panel is mounted for covering a supply channel. The invention further relates to a passenger supply unit and a system comprising a panel for covering a supply channel and a plurality of passenger supply units mounted to the panel.

In passenger cabins of vehicles used in public transport such as passenger aircraft several different apparatuses or supply means are installed overhead the passenger seats. Some of these apparatuses improve the comfort of the passengers while others are provided as safety measures. Examples for apparatuses that improve the comfort of passengers are reading light assemblies, air shower assemblies providing passengers with additional fresh air, so-called paxcall functions for calling a purser onboard an aircraft, speakers or onboard entertainment means. An example of a safety measure is an oxygen supply unit or O2 box which comprises emergency oxygen supply for passengers of an aircraft if cabin pressure is lost.

All of these apparatuses can be arranged in a common supply channel which is formed, for example, underneath overhead luggage compartments. For mounting the apparatuses onboard aircraft in the supply channel two mounting rails extending in a longitudinal direction of the elongated supply channel are provided. The apparatuses mounted in such a supply channel are commonly of identical width such that they cover the entire width of the supply channel and comprise a panel for facing towards the passenger cabin. Empty spaces between the different apparatuses are filled with so-called spacer panels to avoid non-covered parts of the supply channel. A length of the apparatuses in longitudinal direction of the supply channel and their thicknesses differ considerably. Also the different elements are usually supplied by different manufacturers. This has several consequences.

First of all, any of the above apparatuses has to be mounted to the mounting rails using special mounting means. These mounting means have to be adapted to the different apparatuses installed in the supply channel such that outer panels of the apparatuses form an even surface towards the passenger cabin. This makes installing the apparatuses cumbersome and time consuming as different parts are required for each apparatus.

The supply channel is supposed to be covered by an even surface formed by the panels of the different apparatuses. However, it has been found that the color of the different panels and their extension in a mounting or vertical direction, i.e., their height, can only be manufactured with limited accuracy due to production tolerances. Thus, the color of the panels and the height of the apparatuses does usually not exactly match. In combination with the different lengths of the panels in the longitudinal direction of the supply channel an irregular or non-uniform pattern is created which may reduce a passenger's comfort.

Furthermore, the specific arrangement of the apparatuses in the supply channel depends on the seat position and on the requirements of the operator of the vehicle. Furthermore, each of the apparatuses needs to be connected to on ore more systems of the vehicle such as the vehicle's power supply or data system. However, as different layouts are used the connectors have to be provided at different places for each specific layout. Thus, considerable effort is required each time a different layout is implemented or a layout is modified.

SUMMARY OF THE INVENTION

In view of the foregoing, an improved means has been invented for mounting a plurality of apparatuses overhead passenger seats and to provide improved apparatuses to be mounted overhead passengers seats in a passenger cabin of a vehicle to avoid at least some and preferably all of the above disadvantages.

In a first aspect, the problem is solved by a panel which is elongated in a longitudinal direction and adapted for mounting passenger supply units. The mounting surface of the panel comprises a plurality of spaced openings arranged along the longitudinal direction of the panel. Each opening comprises a connector assembly for a passenger supply unit. The panel comprises mounting means for securing passenger supply units mounted to the panel against movement in a mounting direction. The mounting direction extends perpendicular to the longitudinal direction. The mounting surface comprises extended areas for providing support in opposing lateral directions for passenger supply units mounted to the panel. The lateral directions extend perpendicular to the longitudinal direction and the mounting direction. The panel may be provided for use in a passenger cabin of an aircraft.

The present invention may be configured to provide for a panel covering a supply channel and being adapted for mounting passenger supply units overhead passenger seats in a passenger cabin of a vehicle, such as a passenger aircraft. Instead of hindering passengers views into the supply channel using panels that are parts of apparatuses mounted in the supply channel, the present invention provides a dedicated panel covering the supply channel. This panel provides a mounting or outer surface in a single color. Those parts of the mounting surface not covered by a passenger supply unit mounted to the panel are visible to passengers when the panel is mounted for covering a supply channel. The panel, thus, advantageously provides an extended cover for a supply channel formed in one piece or at least less pieces than previously.

The panel does not only prevent passengers from seeing the inside of the supply channel, it further provides means for mounting so-called passenger supply units overhead the seats. Thus, mounting rails are no longer required for mounting the apparatuses in the supply channel reducing the weight of the supply channel. The panel itself can be mounted to a supply channel by various different kinds of mounting means providing, for example, point-like connections or extended but discontinuous connections.

The passenger supply units need not be mounted on that side of the panel facing away from the passenger cabin when the panel is mounted to a supply channel but on the mounting surface of the panel facing towards the passenger cabin. Each passenger supply unit comprises all those apparatuses or supply means that are commonly provided for each row of seats in one supply channel. For example, in an aircraft a single passenger supply unit may comprise an oxygen supply unit, a reading light assembly, an air shower and a paxcall function. Thus, instead of having many different apparatuses as in prior art passenger cabins only a single passenger supply unit is provided for each row of seats in each of the supply channels which reduces the time required to mount the supply means in the aircraft considerably. Furthermore, the panel according to the present invention could be installed for covering supply channels in hat-racks or overhead compartments before these are installed during assembly of the vehicle. Thus, the overall assembly time could further be reduced.

To mount passenger supply units to the panel and to connect apparatuses arranged in the passenger supply units to systems of the vehicle, a plurality of connector assemblies are provided in openings in the mounting surface of the panel. The plurality of openings is arranged spaced apart from one another and aligned in the longitudinal direction of the elongated panel. The openings may be evenly spaced along the longitudinal direction of the panel in fixed distances of, for example, 2.54 cm (1 inch). The passenger supply units can then be arranged in many different configurations along the longitudinal direction of the panel and, therefore, the elongated supply channel. This advantageously allows adapting the passenger cabin to differently spaced rows of seats and differently sized passenger supply units by simply connecting the passenger supply units to different connector assemblies. Thus, when a passenger supply unit needs to be moved to another position no wiring has to be adapted as the connectors are already in place and provide all necessary contact means. Openings comprising connector assemblies that are not connected to passenger supply units can be closed using matching covers.

The panel may be an elongated panel. Its dimensions are defined by three directions or axes extending perpendicular to one another. The longitudinal direction has already been defined. The panel will usually have its longest extension in the longitudinal direction and extends less in the other directions. The longitudinal direction may further extend parallel to a longitudinal direction of an elongated supply channel when the panel is covering the supply channel.

Another direction of the three directions is the mounting direction. The mounting direction can, for example, extend parallel to the vertical direction when the panel is mounted for covering a supply channel. On the panel mounting means are provided for mounting passenger supply units to the panel and securing these passenger supply units against movement in the mounting direction.

Finally, opposing lateral directions are defined which extend perpendicular to both directions already defined. If expressed as vectors, one of the lateral directions is represented by the negative of the other lateral direction. On the mounting surface extended areas are provided for supporting passenger supply units mounted to the panel in the opposing lateral directions. The mounting surface is formed to provide at least partial form-locking or positive locking between the extended areas of the mounting surface and passenger supply units mounted to the panel. Such a surface cannot have a completely flat cross-sectional shape in a plane extending perpendicular to the longitudinal direction but has to have at least two surfaces inclined under a positive and a negative angle, respectively, with respect to the longitudinal direction.

The shape of the mounting surface of the panel facilitates mounting of passenger supply units comprising a matching shape. Passenger supply units mounted to the panel require no or little additional lateral support by mounting means as support in opposing lateral directions of the panel and the supply channel is provided by the mounting surface of the panel. This reduces the number of mounting means required for mounting the panel and, hence, the weight and the cost of the panel. Further, the outer surface does not require additional recesses or openings for mounting means.

The panel may comprise a supply element connecting the plurality of connector assemblies. The supply element can, for example, be provided in form of an internal supply channel that is part of the panel and comprise the wiring and/or supply lines for connecting the connectors to one another and also to a central supply system of a vehicle. Thus, inside the supply element any supply line or wiring required for supplying the passenger supply units through the connector assemblies can be arranged. Examples of supply lines provided in the supply elements will be discussed in more detail with respect to further embodiments of the invention. The supply lines in the supply elements can be preinstalled in the panel. If a panel is installed in a supply channel of a vehicle, each supply line only needs to be connected once to a system of the vehicle. By connecting the supply lines to vehicle systems connector assemblies provided in the panel are automatically connected not only to one another but also to the vehicle systems. This considerably reduces the time required for installing the panel in the vehicle as no individual connections have to be prepared. Furthermore, in case of a fault in the supply element, the panel can easily be removed from the vehicle and replaced by a spare panel. Any maintenance relating to connections of passenger supply units can, thus, be performed without having to cease operation of the entire vehicle for the duration of maintenance.

In an embodiment the supply element comprises at least one data transmission line and each connector assembly comprises a data contact means connected to the data transmission line, wherein the data contact means is adapted for connecting a passenger supply unit to the data transmission line. The data contact means can, for example, provide a mechanical or physical connection between the data transmission line and elements of a passenger supply unit. Alternatively, the data contact means could also provide a wireless connection to a passenger supply unit, for example, using induction or radio frequency signals. Such a data transmission line can be used, for example, to connect a passenger supply unit to a bus system of a vehicle. Through the bus system different means or apparatuses provided in a passenger supply unit can be controlled or provided with required data. Examples of apparatuses connected to a data contact means are reading light assemblies which can be turned on and off or whose orientation can be adjusted, a speaker, a paxcall function and onboard entertainment means. By providing a data transmission line which is connected to all connectors, the panel can be easily and rapidly installed in a supply channel of a vehicle as no individual connections have to be provided for each of the passenger supply units arranged in the channel. Instead only one connection needs to be established for each panel. The data contact means can, for example, also be used to supply power to a passenger supply unit, for example, through a mechanical contact or by induction.

The data transmission line can, for example, be formed as a single printed circuit board comprising openings for supplying air from an air channel to air outlets. Using a single printed circuit board further has the advantage that the connections and wiring available would be standardized.

Today wiring harnesses provided in supply channels are highly customized depending on the supply means that shall be provided in a specific vehicle. If the types of supply means available shall be altered, for example, during retrofit, often the wiring harnesses have to modified or replaced. Using a standardized printed circuit board would reduce the construction effort required and increase the flexibility.

The supply element may comprise an air channel and each connector assembly comprises an our outlet connected to the air channel, wherein the air outlet is adapted for connecting the air shower assembly of a passenger supply unit to the air channel. Thereby, installation of air showers is facilitated which have been found to improve the comfort of passengers. Air showers are commonly supplied with fresh air from the vehicle's air conditioning system. Likewise, the air channel is preinstalled in the supply element such that when installing the panel in a supply channel only a single connection needs to be established to the vehicle's air conditioning system. Any following installation or mounting of a passenger supply unit only requires connecting a matching connecting means at a passenger supply unit to a connector assembly providing an air outlet in an opening of a mounting surface. If covers are provided for closing the openings in the mounting surface, these can, for example, be provided as airtight sealing covers which prevent air from evading through air outlets not connected to a passenger supply unit.

In a further embodiment, the supply element comprises an oxygen supply line and each connector comprises an oxygen supply contact connected to the oxygen supply line, wherein the oxygen supply contact is adapted for connecting an oxygen supply unit of a passenger supply unit to the oxygen supply line. An oxygen supply line can either be a tube or a similar means for providing oxygen from a central oxygen supply to each oxygen supply unit in a passenger supply unit. Thus, the oxygen flow at an oxygen supply unit is started by activating the central oxygen supply. Alternatively, it is also possible to provide the oxygen supply units with local oxygen sources. In this case the oxygen supply line can be an analog or digital data transmission line for sending a command for activating the local oxygen sources.

Each connector assembly may provide mounting means for mounting a passenger supply unit to the panel. Thereby, all connections from a passenger supply unit and the mounting of the panel can be provided using a single connecting means and only a single opening needs to be provided in the panel for each passenger supply unit. All mounting means for one passenger supply unit can be arranged in the same opening. However, it may also be possible to arrange the mounting means at two spaced apart connector assemblies to provide additional support for passenger supply units in the longitudinal direction.

The mounting surface of the panel may be delimited by two lateral edges extending parallel to the longitudinal direction. The cross-sectional shape of the mounting surface in a plane extending perpendicular to the longitudinal direction is formed such that the mounting surface does not extend beyond a straight line extending between the lateral edges, wherein the straight line extends in the plane extending perpendicular to the longitudinal direction. In other words, the mounting surface does not protrude through the line extending between the lateral edges. If such a panel is mounted in a supply channel, no element of the mounting surface extends further out of the supply channel than the lateral edges. Thus, the head room or head clearance provided in the passenger cabin may be increased as compared to when flat panels are used to cover a supply channel as it is known from the prior art.

The mounting surface may have a concave cross-sectional shape in a plane extending perpendicular to the longitudinal direction. A concave shape, i.e. a continuously curved surface in a plane extending in the lateral direction and the mounting direction of the panel, further facilitates a robust and tight mounting of passenger supply units to the panel. The cross-sectional shape of the mounting surface may, for example, follow an arc and a shape of a matching surface of a passenger supply unit may be formed along an arc with a slightly wider radius to provide a tight positive fit between the mounting surface of the panel and the passenger supply unit. A concave cross-sectional shape provides even further head room for passengers in a cabin.

Each opening may be arranged at least partly in a location on the mounting surface having a largest perpendicular distance from the straight line extending between the lateral edges. In other words, if the panel is mounted for covering a supply channel, the opening is arranged at least partly in a location on the mounting surface being furthest inside the supply channel, i.e. furthest away from the passenger cabin.

In a further embodiment, the cross-sectional shape of the mounting surface in a plane extending perpendicular to the longitudinal direction does not change along the longitudinal direction. The passenger supply units may have the same or a very similar top surface for engagement with the mounting surface can be arranged along the entire length of the panel.

The cross-sectional shape of the mounting surface may be in a plane extending perpendicular to the longitudinal direction may be symmetrical with respect to a plane extending parallel to the longitudinal direction and the mounting direction. A symmetrical cross-sectional shape of the mounting surface advantageously allows using the same passenger supply units on either side of an aisle in a passenger cabin. Thus, the number of different shapes of passenger supply units required for equipping the vehicle is reduced.

In a second aspect the problem is solved by a passenger supply unit to be mounted in a passenger cabin of a vehicle having a top surface and comprising holding means and connecting means. The passenger supply unit extends in a first direction. The holding means are adapted for securing the passenger supply unit against movement in a second direction when the passenger supply unit is mounted to the panel for covering a supply channel. The second direction extends perpendicular to the first direction. The top surface is adapted for engagement with an extended area of a mounting surface of a panel for covering a supply channel such that by an engagement of the top surface with a mounting surface the passenger supply unit can be supported in opposing third directions, wherein the third directions extend perpendicular to the first direction and the second direction. The connecting means extends through the top surface and is adapted for connecting the passenger supply unit through the top surface to a connector assembly of a panel for covering a supply channel when the passenger supply unit is mounted to the panel. The passenger supply unit may be provided for use in a passenger cabin of an aircraft.

The passenger supply unit is, similar to the panel according to the present invention, also defined by three different directions which are perpendicular to one another. The panel extends in a first direction which may extend parallel to a longitudinal direction of a panel when the passenger supply unit is mounted to the panel. A second direction extends perpendicular to the first direction and may be parallel to a mounting direction of a panel when the passenger supply unit is mounted to the panel. Finally, the third directions extend perpendicular to the first and the second direction and may be parallel to the lateral directions of a panel when mounted to the panel.

On the passenger supply unit holding means are supplied for mounting or securing a passenger supply unit to a panel and preventing movement of the passenger supply unit in the second direction away from a panel when the passenger supply unit is mounted to the panel. The holding means can, for example, be formed to interact with mounting means provided at a panel according to any of the embodiments.

The top surface of the passenger supply unit is formed such that it can engage in a positive lock with extended areas of a matching mounting surface of a panel for covering a supply channel to which the passenger supply unit can be mounted. The cross-sectional shape in a plane extending perpendicular to the first direction of the top surface is chosen such that it can support the passenger supply unit against lateral movements in the third directions. At least one section of the cross-sectional shape extends inclined under a positive angle with respect to the third direction and at least one other section extends inclined under a negative angle with respect to the same third direction. The surfaces are not only in contact in a few points but over extended areas extending at least in two dimensions. Thus, the passenger supply unit may be supported in the third directions entirely by an engagement of the top surface with a mounting surface of the panel. The holding means, therefore, to not have to carry any or at least less loads acting in the third directions when the passenger supply unit is mounted to a panel.

Furthermore, a connecting means is provided for connecting any of the means and apparatuses provided in the passenger supply unit to systems of the vehicle through the connector assemblies provided in the openings of the panel. These connecting means form, for example, male connectors extending out of the top surface of the passenger supply unit which can engage with matching connector assemblies in the openings of the panel which may form, at least with respect to the outer surface of the panel, female connectors. The connecting means are advantageously simple plugs which can be easily connected to mating connector assemblies without having to manually establish many different connections. Therefore, installation of passenger supply units according to the present invention requires less time than previously known passenger supply units.

The top surface of the passenger supply unit may be delimited by a closed edge. A cross-sectional shape of the top surface in a plane extending perpendicular to the first direction is formed such that a straight line extending between opposing sides of the closed edge in the plane extending perpendicular to the first direction does not intersect the top surface. In other words, the top surface advantageously extends entirely on one side in the second direction of a line connecting sections of the closed edge. The top surface may be provided for mounting passenger supply units to a panel for a covering supply channel providing additional head room for passengers due to its cross-sectional shape.

The cross-sectional shape of the top surface is convex in a plane extending perpendicular to the first direction. The cross-sectional shape of the top surface may be symmetrical with respect to a plane extending parallel to the first direction and the second direction. A symmetrical cross-sectional shape of the top surface allows mounting the same passenger supply unit on either side of the aisle of a passenger cabin. Thus, less different shapes of passenger supply units are required reducing the number of passenger supply units that have to be constructed and that have to be kept in stock as spare parts.

The passenger supply unit may comprise an oxygen supply unit and the connecting means of the supply unit comprises contact means for connecting the oxygen supply unit to an oxygen supply contact provided at a connector assembly of a panel for covering a supply channel when the passenger supply unit is mounted to the panel.

The passenger supply unit may comprise supply means in form of a reading light assembly and/or a speaker and/or a means to provide paxcall functions and/or entertainment means. The connecting means of the passenger supply unit comprises a contact means for connecting the supply means to a data contact means provided at a connector assembly of a panel for covering a supply channel when the passenger supply unit is mounted to the panel.

Further, the passenger supply unit may comprise an air shower and the connector of the passenger supply unit comprises an air inlet for connecting the air shower to an air outlet provided at a connector assembly of a panel for covering a supply channel when the passenger supply unit is mounted to the panel.

Providing different apparatuses that improve the passenger's well being or his safety in form of the single passenger supply unit mounted to a panel and connected to systems of a vehicle through a single connector advantageously reduces the installation time in the vehicle as most components can be mounted completely installed. Furthermore, if a passenger supply unit malfunctions it can simply be replaced by a spare part and less time is required in which the entire vehicle is out of order for maintenance.

Further advantages of the different passenger supply units correspond to the advantages already described with respect to the different embodiments of the panel according to the present invention. Several aspects of the passenger supply units according to the invention have already been described with respect to the panel according to the present invention. These aspects apply to the respective embodiments of a passenger supply unit according to the present invention.

In a third aspect the problem underlying the present invention is solved by a system comprising a panel according to any of preceding embodiments and a plurality of passenger supply units according to any of the preceding embodiments mounted to the panel. The system may be provided for use in a passenger cabin of an aircraft. The advantages of the system correspond to the advantages of the respective embodiments of the panel and the passenger supply unit according to the present invention employed therein.

SUMMARY OF THE DRAWINGS

An exemplary embodiment of a system according to the present invention comprising an exemplary embodiment of a panel according to the present invention and an exemplary embodiment of a passenger supply unit according to the present invention will now be described with reference to the drawings, wherein.

DETAILED DESCRIPTION OF THE INVENTION

A system 1 includes a section of a panel 3 according to the present invention for covering a supply channel and two passenger supply units 5. The panel 3 will be described in more detail with reference to FIGS. 2, 3 and 4 and one of the passenger supply units 5 will be described in more detailed with reference to FIGS. 5 and 6. Before describing the details of the parts of the system 1, the overall arrangement is first described with reference to FIG. 1.

Figure 1:
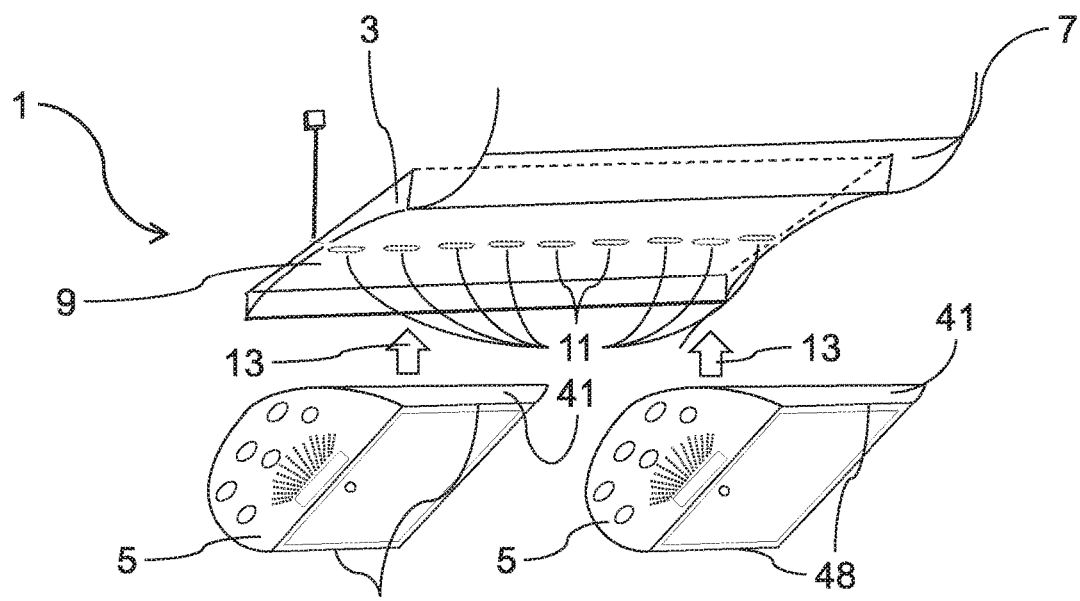
FIG. 1 is a schematic perspective view of an embodiment of a system according to the present invention comprising a panel and two passenger supply units.

As shown in FIG. 1, the panel 3 is mounted to an overhead compartment 7 in a passenger cabin of an aircraft, such as above passenger seats in the cabin. The panel covers a supply channel not shown in the Figures. The overhead compartment 7 is used for storing hand luggage of passengers travelling in the passenger cabin. The panel 3 comprises a mounting surface 9 facing towards the passenger cabin in which the panel 3 has been mounted. The mounting surface 9 comprises a plurality of openings 11. In FIG. 1 the openings 11 are shown as closed with covers (see FIG. 6) such that connector assemblies arranged in the openings 11 are not visible to a passenger in the passenger cabin. The covers also provide an airtight sealing of air outlets provided in the connector assemblies such that no air can evade through the air outlets unless the cover has been removed.

The mounting surface 9 with the covers in place provides a smooth surface over an extended length of a supply channel. Prior art panels only extended sufficiently far to cover an apparatus arranged behind the respective cover or to cover empty spaces between adjacent apparatuses. Hence, many different covers having slightly varying colors due to different manufacturers, production tolerances and differing lengths covered a supply channel. This results in an irregular surface both in color and in length of the panels. Using panels 3 according to the present invention results in a uniform appearance of the ceiling beneath the overhead compartments 7 and above the passenger seats, both in length and in color as the entire supply channel is covered by the same kind of panel 3.

Figure 2:
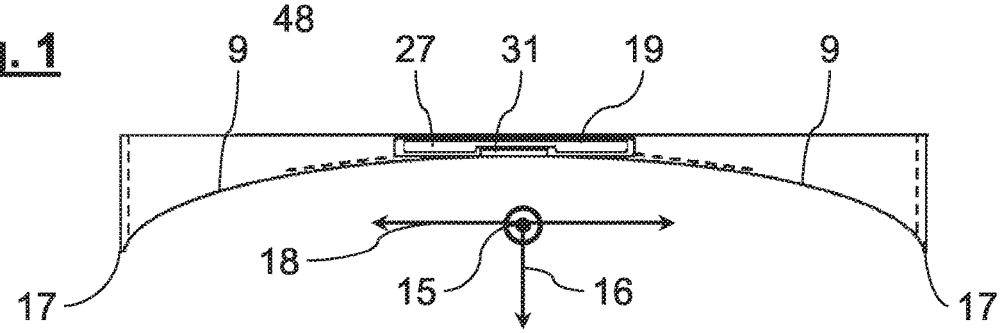
FIG. 2 is a sectional view of the panel shown in FIG. 1.
Figure 3:
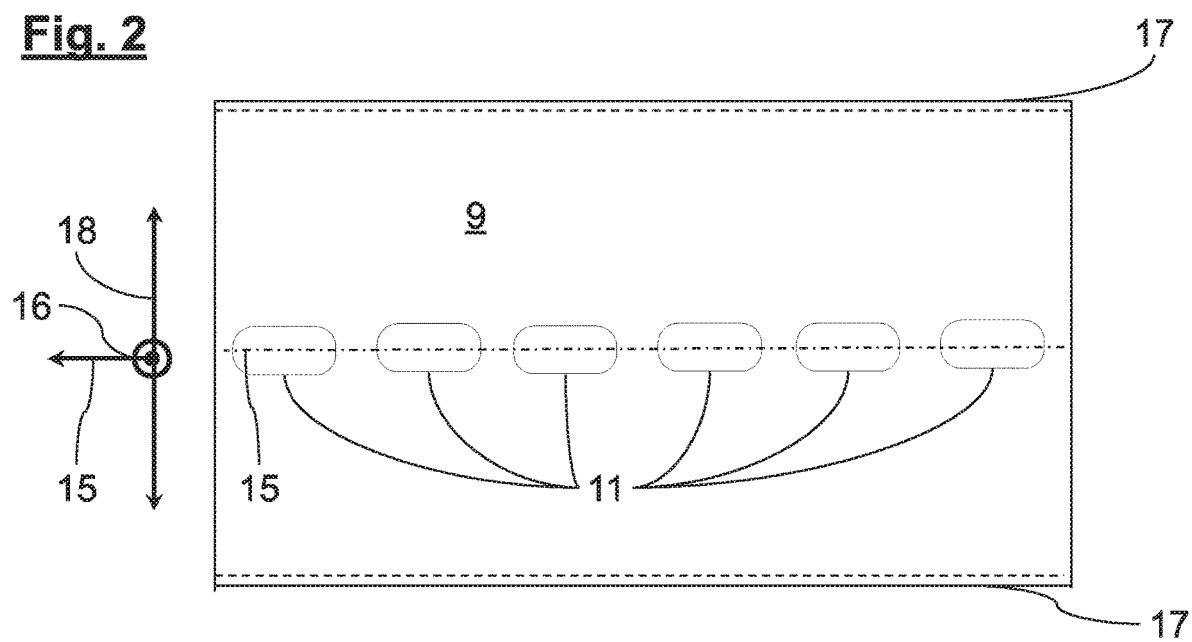
FIG. 3 is a top view of the panel of FIGS. 1 and 2.

A longitudinal direction 15 of the elongated panel 3 is indicated by the dash-dotted line 15 in FIG. 3. FIG. 2 shows a cross-sectional view of the panel 3 of FIG. 1 in a plane extending perpendicular to this longitudinal direction 15 of the panel 3. In the plane extending perpendicular to the longitudinal direction 15 a mounting direction 16 and lateral directions 18 are defined, wherein the lateral directions 18 extend perpendicular to the mounting direction 16. As can be seen in FIGS. 1, 2 and 3 the mounting surface 9 of the panel 3 forms a depression in a plane extending perpendicular to the longitudinal direction 15 of the panel 3. In other words, lateral edges 17 of a mounted panel 3 extending parallel to the longitudinal direction 15 are closer to passengers in the passenger cabin than the remainder of the mounting surface 9. The cross-sectional shape of the mounting surface 9 has been chosen such that mounting surface 9 is entirely on one side of a line connecting the lateral edges 17 in the plane extending perpendicular to the longitudinal direction 15. On the mounting surface 9 extended areas are provided for engagement with a matching top surface of a passenger supply unit 5.

In the exemplary embodiment shown in the Figures the cross-sectional shape of the mounting surface 9 results in a thicker panel 3 near the lateral edges 17 than at the center of the panel 3. The center of the panel 3 is indicated by the longitudinal direction 15. The shape of the mounting surface 9 in the plane extending perpendicular to the longitudinal direction 15 is concave. The shape of the mounting surface 9 advantageously provides lateral support in opposing lateral directions 18 for passenger supply units 5 mounted to the panel 3 having a matching top surface. Thus, the mounting means (mounting devices) take up little or no lateral loads are required. Passengers travelling in a passenger cabin in which panels 3 are mounted for covering supply channels also benefit from additional head room compared to conventional flat panels.

As can be seen best in FIG. 3 the openings 11 which are closed by suitable covers in FIG. 3 are equally spaced and arranged in the center of panel 3. Due to the symmetrical shape of the panel 3 in the plane extending perpendicular to the longitudinal direction 15 the center of panel 3 corresponds to the deepest point of the depression formed by the mounting surface 9. In other words, in a plane extending perpendicular to the longitudinal direction 15 the openings 11 are at least partly arranged in a location having the largest perpendicular distance to a line connecting the lateral edges 17 in the plane. Passenger supply units 5 mounted to connector assemblies arranged in the openings 11 are, thus, provided equal lateral support on both sides and any mounting means arranged in the openings 11 do not need to take up significant lateral loads. Furthermore, symmetrical panels 3 can be mounted on both sides of an aisle in a passenger cabin. Thus, advantageously no different panels 3 have to be produced for different sides of an aisle.

Underneath the openings, a single supply element 19 is arranged. In FIG. 2 the shape of the supply element 19 in the plane extending lateral to the longitudinal direction 15 is shown. The supply element will be described in more detail with reference to FIG. 4.

The supply element 19 connects the connector assemblies 21 arranged in the openings 11. As indicated by arrows 23, the connector assemblies are equally spaced in the longitudinal direction 15 (extending in the same direction as the arrows 23) of the panel 3. The spacing can be, for example, 2.54 cm (1 inch). The connector assemblies 21 provide a plurality of contact means (connectors) or outlets 25, 29, 33 for connecting a passenger supply unit 5 to central systems of an aircraft.

First of all, each of the connector assemblies 21 comprises an air outlet 25 for connecting an air shower assembly of a passenger supply unit to an air conditioning system of an aircraft. The air outlets 25 are connected to one another by an air channel 27 which is also provided in the supply element 19.

Furthermore, each connector assembly 21 comprises data contact means (data contacts) 29 for connecting passenger supply units 5 or specific means provided in the passenger supply units 5 to a central data system of an aircraft. The data contact means 29 are connected by a data transmission line 31 in the form of a single printed circuit board 31. The data contact means 29 are simply attached to the printed circuit board 31 which essentially provides a multiple socket outlet. In the printed circuit board 31 openings or holes are provided through which air can pass from the air channel 27 to the air outlets 25. The same contact means 29 also provides power to the passenger supply unit 5. The data transmission line 31 could also be provided as wiring, for example, in the form of flex cables. Furthermore, the data contact means 29 could also be wireless data contact means 29, for example, for transmitting data to passenger supply units 5 using radio frequency signals and power using induction coils.

Figure 4:
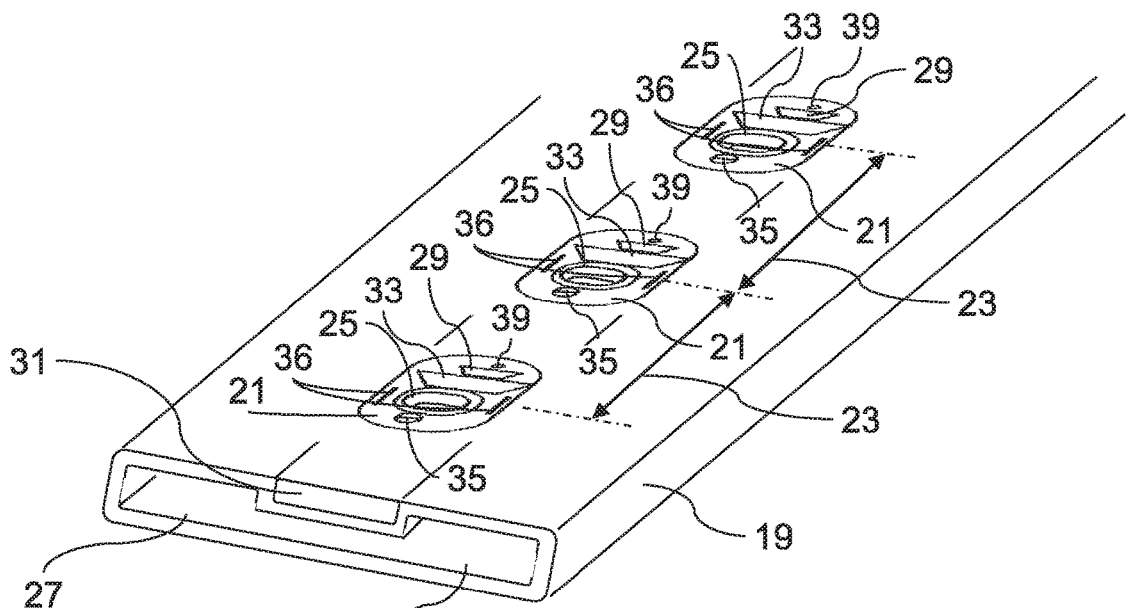
FIG. 4 is a detailed perspective view of a supply element of the panel shown in FIGS. 1 to 3.

The connector assemblies 21 further comprise oxygen supply contacts 33 for connecting oxygen supply units of passenger supply units 5 to a central oxygen supply systems through an oxygen supply line. In FIG. 4 the oxygen supply line is provided in form of a separate data transfer line in the printed circuit board 31, i.e. the passenger supply units 5 comprise independent oxygen sources which can be activated by a signal transmitted through the oxygen supply line.

The supply element of FIG. 4 reduces the installation time and maintenance time of aircraft cabins. Advantageously instead of having to connect every element mounted overhead passengers in a passenger cabin to the respective onboard system only the data transmission line 31 and the air channel 27 have to be connected to the onboard systems. The passenger supply units 5 can be directly connected to preinstalled connector assemblies 21. Due to the narrow spacing of the connector assemblies 21, the passenger supply units 5 can be flexibly arranged in the cabin to adjust to different cabin layouts. Hence, different amenities and safety measures can be provided by different passenger supply units 5. Overall the amount of wiring that has to be installed in the cabin is drastically reduced.

Figure 5:
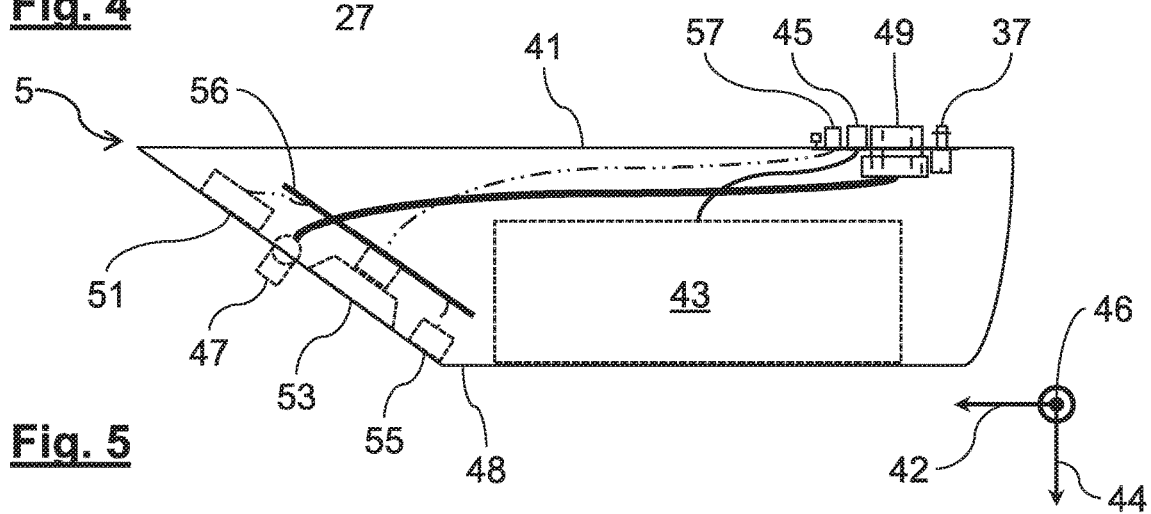
FIG. 5 is a sectional view of a passenger supply unit shown in FIG. 1
Figure 6:
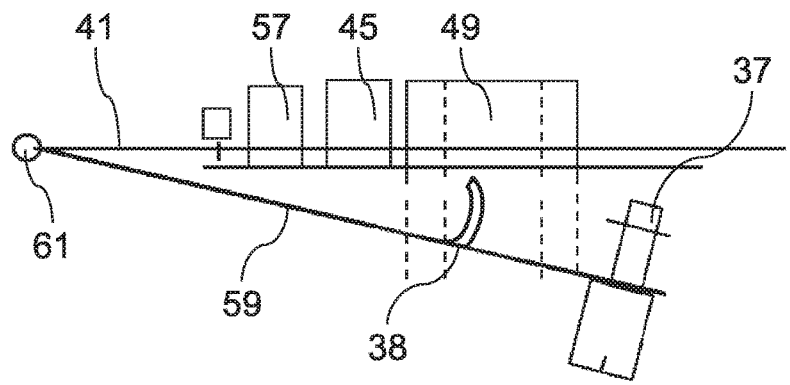
FIG. 6 is a sectional view of an exemplary embodiment of connecting means and holding means of a passenger supply unit according to the present invention.

The connector assemblies 21 further comprise a mounting element 35, 36 in form of a recess 35 for receiving a fastener 37 shown in FIGS. 5 and 6 and two slits 36 for receiving hooks 38 shown in FIG. 6. The fastener 37 and the hooks 38 are part of a latching mechanism for mounting passenger supply units 5 to the panel 3 which will be described in more detail with reference to FIG. 6. Thus, advantageously not only the supply contacts 25, 29, 33 for the passenger supply units 5 are provided at the connector assemblies 21 but also mounting elements 35, 36. Therefore, different mounting elements need not be required for mounting supply means. All passenger supply units 5 are connected by the same kind of connector assembly 21.

Finally, each connector assembly 21 comprises a light emitting diode (LED) 39. The LEDs can be selectively turned on and off by a maintenance system of an aircraft. When installing passenger supply units 5 only LEDs 39 arranged in connector assemblies 21 to which a passenger supply unit 5 shall be connected are switched on. Hence, the maintenance or installation crew can quickly determine the correct connector assemblies 21 to be used.

In FIG. 1, arrows 13 indicate that the two passenger supply units 5 are to be mounted to the panel 3. The passenger supply units 5 have a top surface 41 which is adapted for engagement with an extended area of the mounting surface 9 of a panel 3 to provide lateral and longitudinal support for the passenger supply units 5.

In FIG. 5, a sectional view of a passenger supply unit 5 is shown. The passenger supply unit 5 is defined by three perpendicular directions. The passenger supply unit 5 extends in a first direction 42 which extends parallel to the longitudinal direction 15 of a panel 3 when the passenger supply unit 5 is mounted to the panel 3. A second direction 44 extends perpendicular to the first direction 42 and parallel to a mounting direction 16 of a panel 3 when the passenger supply unit 5 is mounted to the panel 3. Both the first and the second direction 42, 44 extend in the plane of the drawing shown in FIG. 5. Finally, a third direction 46 is defined extending perpendicular to the first and the second direction 42, 44 and parallel to a lateral direction 18 of a panel 3 when the passenger supply unit 5 is mounted to the panel 3.

The top surface 41 of the passenger supply unit 5 has a convex cross-sectional shape in a plane extending perpendicular to the first direction 42 as can be seen best in FIG. 1. Thus, any lines connecting a closed edge 48 delimiting the top surface 41 in planes extending perpendicular to the first direction 42 and in the exemplary embodiment of FIG. 5 parallel to the third direction 46 do not intersect the top surface. The top surface 41 is entirely arranged on one side of the lines when viewed in the second direction 44. The cross-sectional shape of top surface 41 is advantageously symmetrical with respect to a plane extending parallel to the first and the second direction 42, 44. Thus, passenger supply units 5 can be mounted on either side of an aisle in a passenger cabin.

The passenger supply unit 5 comprises an oxygen supply unit or 02 box 43 which can be connected to an oxygen supply contact 33 at a connector assembly 21 by respective connecting means 45. Likewise, an air shower assembly 47 can be connected through an air inlet 49 to an air outlet 25 at a connector assembly 21. The passenger supply unit 5 further comprises supply means 51, 53, 55 in form of a display 51 for displaying information or in-flight entertainment for passengers, a speaker 53 and a reading light assembly 55. A single printed circuit board 56 is provided on which the different supply means 51, 53, 55 are arranged or to which they are connected.

Further supply means or functions such as a paxcall function also provided in the passenger supply unit 5 are not shown in FIG. 5. The latter means are all connected to a power supply and a data connection through contact means 57 for connecting the passenger supply unit 5 to the data contact means (data connector) 29 provided at the connector assembly 21. Such data contact means 29, 57 can provide a mechanical or physical connection as shown in the Figures. However, it is also possible to provide wireless connections, for example, radio frequency connections for transmitting data or inductive connections for transmitting power and/or data. In this case the contact means 29, 57 have to be adapted accordingly. The data contact means 29 advantageously allows to provide different supply means simply by exchanging the passenger supply units 5, for example, during retro-fit or by using different passenger supply units 5 in different seating areas of the aircraft as the data sent over the data contact means 29 can be addressed to different functions or apparatuses provided in the respective passenger supply units 5.

The passenger supply unit 5 also comprises holding means (fasteners) 37, 38 for mounting the passenger supply unit 5 to a panel 3 which covers a supply channel. The holding means 37, 38 are adapted for primarily securing the passenger supply unit 5 against movement in the second direction 44. In FIG. 6 an exemplary mechanism is shown which facilitates mounting the passenger supply unit 5 to a panel 3. The holding means 37, 38 are arranged on a tilting element 59 which can be tilted with respect to the passenger supply unit about an axis 61 extending parallel to the third direction 46.

When the top surface 41 has been brought into engagement with a matching mounting surface 9 of a panel 3 and the connecting means (connectors) 45, 49, 57 have been connected to matching connectors 25, 29, 33 on a connector assembly 21, the tilting element 59 is tilted from an inclined position with respect to the first direction 42 to a locking position in which it extends parallel to the first direction 42.

While the tilting element 59 is tilted into the locking position, hooks 38 (only one hook 38 is shown in FIG. 6) engage with slits 36 provided at the connector assembly 21. The hooks 38 primarily provide support for the passenger supply unit 5 in the mounting direction 16 or second direction 44. However, they can also provide support in the further directions 15, 18, 42, 46. Finally, a fastener 37 is brought into engagement with a mating mounting element 35 provided at the connector assembly 21 and locked, for example, with a screw driver. The screw driver can advantageously also be used for tilting the tilting element 59 into the locking position. An opening provided in the housing of the passenger supply unit 5 for the screw driver can advantageously be closed with a cover previously used to cover the opening 11 in which the connector assembly 21 is arranged to which the passenger supply unit 5 has been connected.

The holding means 37, 38 shown in FIG. 6 advantageously allows a single person to mount the passenger supply unit 5 to a panel 3 as only one hand is required to engage and lock the holding means 37, 38 to the mounting means 35, 36 provided at the connector assembly 21.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger supply unit configured to be mounted to a panel covering a supply channel in a passenger cabin, wherein the passenger supply unit extends in a first direction and the passenger supply unit comprises:
   holding means adapted for securing the passenger supply unit against movement relative to the panel in a second direction when the passenger supply unit is mounted to the panel, wherein the second direction extends perpendicular to the first direction,
   a top surface adapted for engagement with an extended area of a mounting surface of the panel such that by an engagement of the top surface with the mounting surface the passenger supply unit is supported in opposing third directions, wherein the third directions extend perpendicular to the first direction and the second direction, and
   connecting means extending through the top surface and adapted for connecting the passenger supply unit to a connector assembly of the panel when the passenger supply unit is mounted to the panel
   wherein a cross-sectional shape of the top surface is convex in a plane extending perpendicular to the first direction and the cross-sectional shape of the top surface is symmetrical with respect to a plane extending parallel to the first direction and the second direction.

2. The passenger supply unit according to claim 1, wherein the passenger supply unit comprises an oxygen supply unit and the connecting means of the passenger supply unit comprises contact means for connecting the oxygen supply unit to an oxygen supply contact provided at the connector assembly of a panel for covering a supply channel when the passenger supply unit is mounted to the panel.

3. The passenger supply unit according to claim 1, wherein the passenger supply unit comprises a reading light assembly, and wherein the connecting means of the passenger supply unit comprises a contact connector configured to connect to a data contact at the connector assembly of the panel for covering the supply channel when the passenger supply unit is mounted to the panel.

4. The passenger supply unit according to claim 1, wherein the passenger supply unit comprises an air shower assembly and the connecting means of the passenger supply unit comprises an air inlet for connecting the air shower assembly to an air outlet provided at the connector assembly of a panel for covering a supply channel when the passenger supply unit is mounted to the panel.

5. A passenger supply unit configured to be mounted to a panel covering a supply channel in a passenger cabin, wherein the passenger supply unit extends in a first direction and the passenger supply unit comprises:
   holding means adapted for securing the passenger supply unit against movement relative to the panel in a second direction, wherein the second direction extends perpendicular to the first direction,
   a top surface adapted for engagement with an extended area of a mounting surface of the panel such that by an engagement of the top surface with the mounting surface the passenger supply unit is supported in opposing third directions, wherein the third directions extend perpendicular to the first direction and the second direction, and
   connecting means extending through the top surface and adapted for connecting the passenger supply unit to a connector assembly of the panel,
   wherein the top surface is delimited by a closed edge perimeter including a first side edge parallel to the first direction and a second side edge parallel to the first direction, and
   wherein a cross-sectional shape of the top surface in a plane extending perpendicular to the first direction is formed such that a straight line extending between the first side edge and the second side edge in the plane extending perpendicular to the first direction intersects the top surface only at the first side edge and at the second side edge.

6. A passenger supply unit configured to be mounted in a passenger cabin of a vehicle and above at least one passenger seat in the passenger cabin, the passenger supply unit comprising:
   a top surface extending in a first direction and convex in a cross section of the top surface taken along a second direction perpendicular to the first direction, wherein the top surface is configured to seat on a lower surface of a mounting panel fixed to the passenger cabin and the lower surface extends in the first direction and is concave in cross section along the second direction;
   a connector extending through the top surface and configured to cover and fluidly connect to an outlet of a gas supply channel in the mounting panel; and
   fasteners at an apex of the top surface and aligned along the first direction, wherein at least one of the fasteners is configured to engage a slit in the lower surface of the mounting panel.

7. The passenger supply unit according to claim 6, wherein the top surface has a closed edge perimeter including first side edge parallel to the first direction and a second side edge parallel to the first direction, and a cross-sectional shape of the top surface in a plane extending perpendicular to the first direction is formed such that a straight line extending from the first edge and the second edge is perpendicular to the first direction and intersects the top surface only at the first edge and the second edge.

8. The passenger supply unit according to claim 6, wherein the top surface has a cross-sectional shape which is symmetrical with respect to a plane extending parallel to the first direction and the second direction.

9. The passenger supply unit according to claim 6, wherein the passenger supply unit comprises an oxygen supply unit connected by a conduit having an end at the connector and in fluid communication with the outlet of the gas supply channel.

10. The passenger supply unit according to claim 6, wherein the passenger supply unit comprises a reading light assembly mounted to a side panel of the passenger supply unit and the side panel has an upper edge configured to be adjacent the top surface.

11. The passenger supply unit according to claim 10, wherein the upper edge of the side panel forms an arch and has lower ends aligned with lower edges of the top surface, wherein the lower edges of the top surface extend in the first direction.

12. The passenger supply unit according to claim 11 wherein the side panel includes a lower edge extending between the lower ends of the upper edge of the side panel.

13. The passenger supply unit according to claim 6, wherein the passenger supply unit includes an air shower assembly mounted to a side panel of the passenger supply unit, and the side panel has an upper edge configured to be adjacent the top surface.

\* \* \* \* \*